R. C. GRAVES.

Grate-Bars.

No. 6,353. Reissued March 30, 1875.

WITNESSES:

Elza Turner

F. A. Burngardner

INVENTOR:

Robert C. Graves.

THE GRAPHIC CO. PHOTO-LITH. 39 & 41 PARK PLACE, N.Y.

UNITED STATES PATENT OFFICE.

ROBERT C. GRAVES, OF CAMBRIDGE, OHIO, ASSIGNOR TO WILLIAM H. HOBBS, AND R. C. GRAVES.

IMPROVEMENT IN GRATE-BARS.

Specification forming part of Letters Patent No. 135,799, dated February 11, 1873; reissue No. 6,353, dated March 30, 1875; application filed February 8, 1875.

*To all whom it may concern:*

Be it known that I, ROBERT C. GRAVES, of Cambridge, in the county of Guernsey and State of Ohio, have invented a new and valuable Improvement in Furnace Grate-Bars; and I do hereby declare that the following is a full, clear, and exact description of the construction and operation of the same, reference being had to the annexed drawing making a part of this specification, and to the letters and figures of reference marked thereon.

Figure 1:
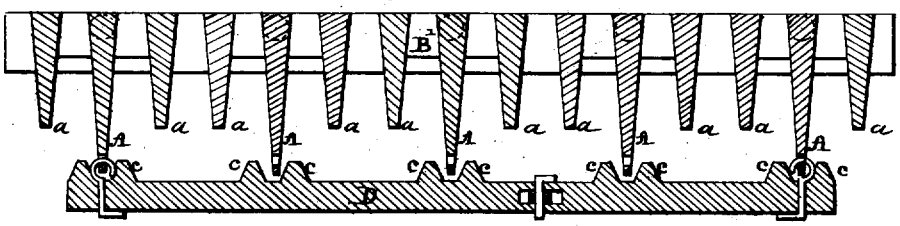
Figure 2:
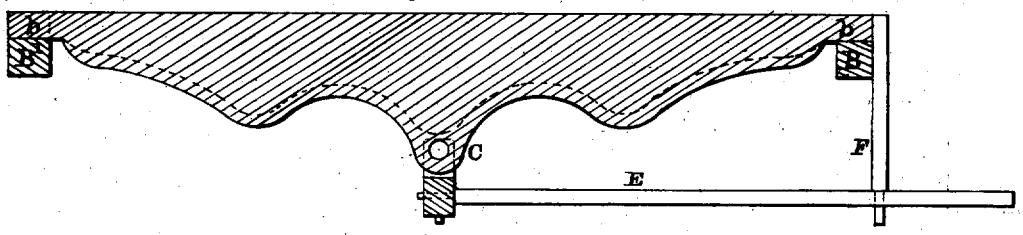

Figure 1 of the drawing is a representation of a transverse vertical section of the grate, and Fig. 2 is a longitudinal section through the middle rib of the grate-bar.

This invention has relation to furnace-grates; and it consists in the construction and novel arrangement of the triple grate-bars with unequal ribs, and the recessed reciprocating bar for actuating the same, whereby a sufficient amount of play is allowed in the agitation of the grate-bars, while the reciprocating actuating-bar is brought up close under the grate, all as hereinafter described.

Referring to the drawing, A *a* designate the grate-bars, cast in sets of three, which are connected together at their ends by cross-pieces, from which project pivots *b*, fitting sockets in the front and back bars B B′ of the grate-frame. The bars A have their middle parts constructed with depending portions or lugs C, to fit between studs *c*, on the upper surface of a transverse bar, D, which is hinged to the two outer bars of the series A, or may be hinged to all. To this bar is pivoted a lever, E, which extends to the front of the grate, and is fulcrumed on a depending standard, F. The grate-bars are rocked from side to side by properly vibrating the lever E, and are limited in their movement by the inner surfaces of the studs *c*, which are beveled, as shown, and which prevent the bars from turning over, and allowing the fuel to fall out.

It will be noticed that the side bars *a* do not extend down so far as the middle bars A, and that the reciprocating bar D is cut away or recessed under said side bars, the object being to provide space for the oscillation of the grate-bars.

What I claim as new is—

The combination of the bar D, provided with studs *c*, with grate-bars or ribs A, and operating lever E, substantially as and for the purposes set forth.

ROBERT C. GRAVES.

Witnesses:

J. K. CHURCHILL,

C. E. SMITH.